(No Model.)
7 Sheets—Sheet 1.
S. H. MARKHAM.
MACHINE FOR MAKING NUTS.
No. 515,005.
Patented Feb. 20, 1894.
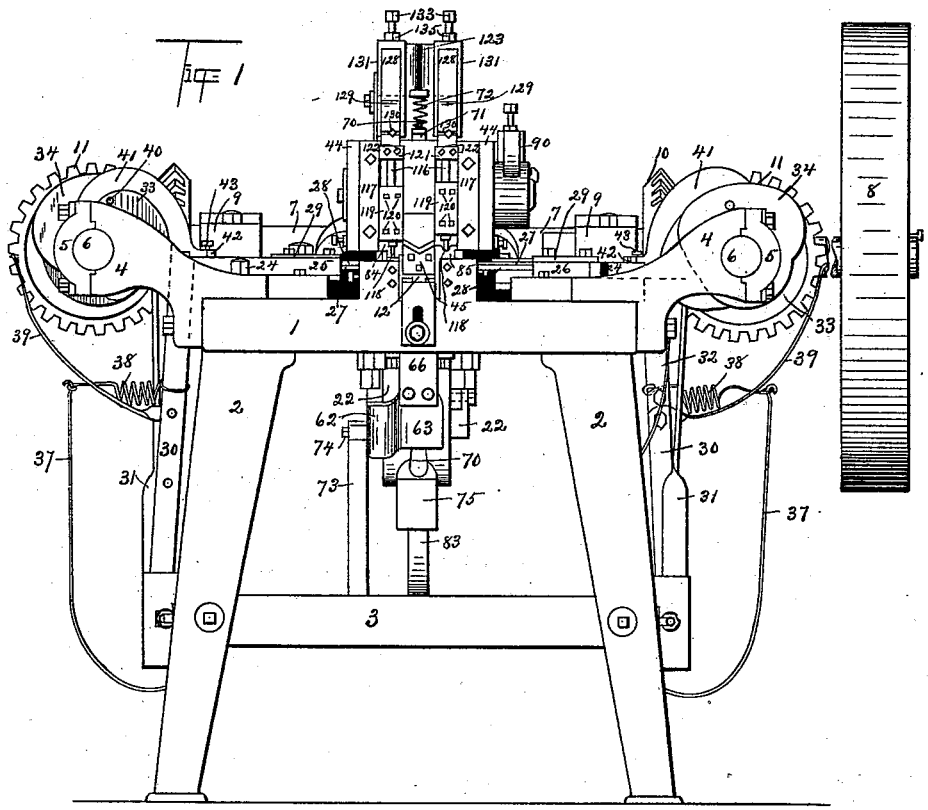
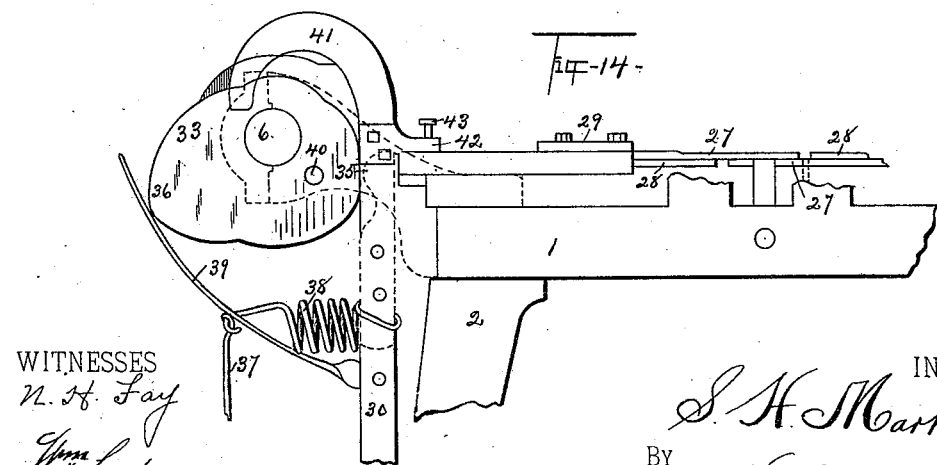
WITNESSES
INVENTOR
BY
ATTORNEYS

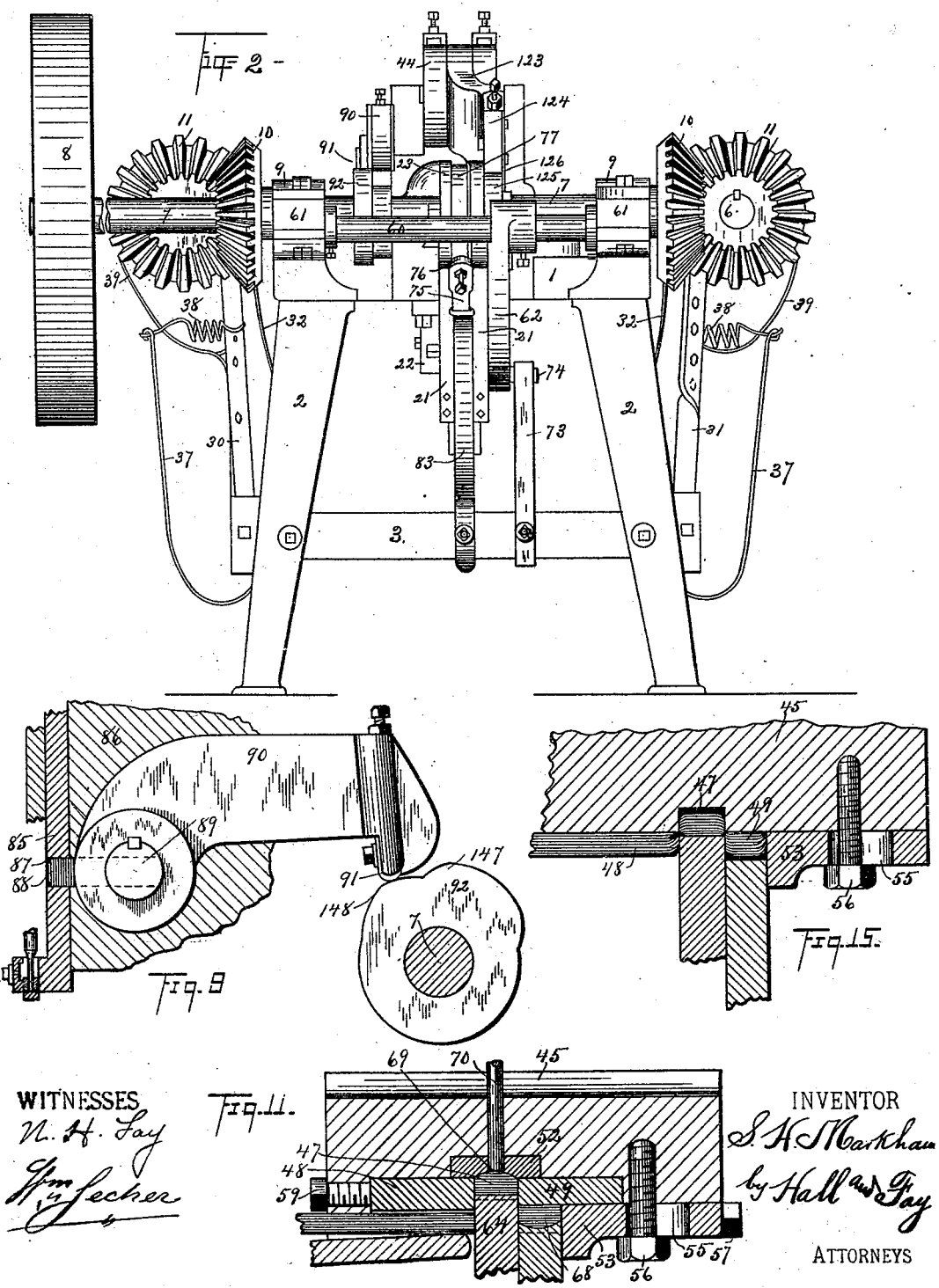

(No Model.)  7 Sheets—Sheet 3.
S. H. MARKHAM.
MACHINE FOR MAKING NUTS.
No. 515,005. Patented Feb. 20, 1894.
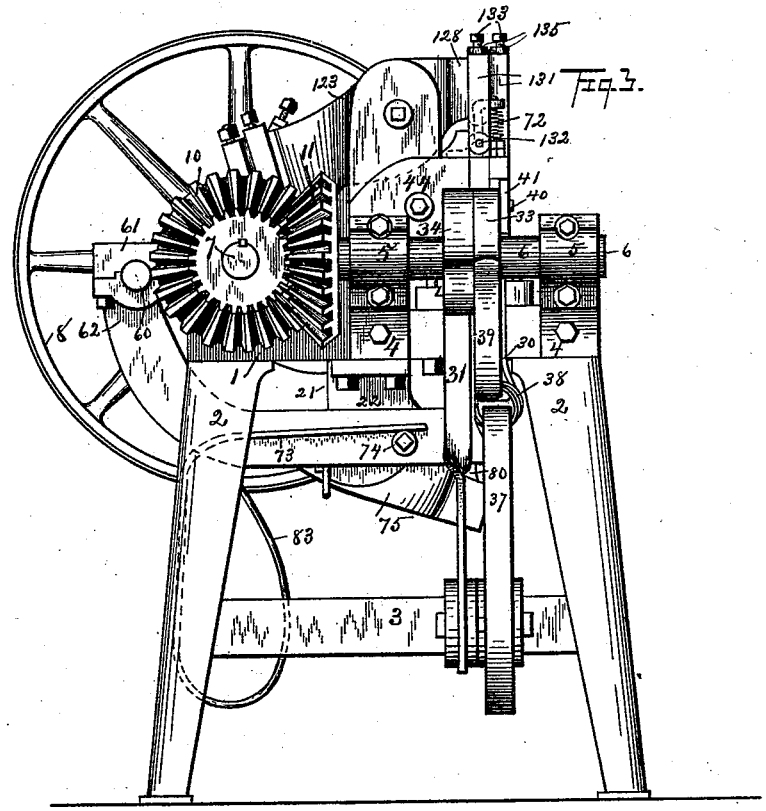
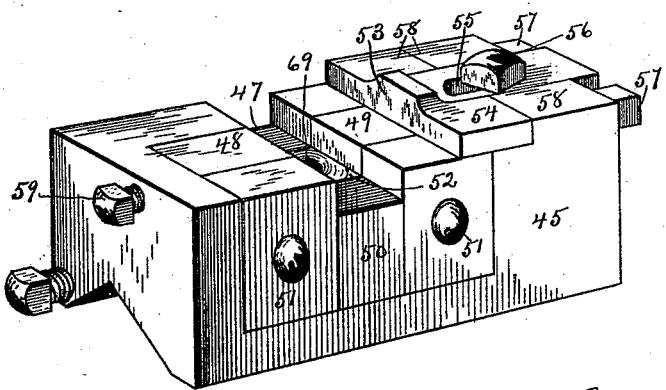
WITNESSES
INVENTOR (No Model.)  
7 Sheets—Sheet 4.

S. H. MARKHAM.
MACHINE FOR MAKING NUTS.

No. 515,005.  
Patented Feb. 20, 1894.

WITNESSES  
N. H. Fay  
Wm Fecher

INVENTOR  
S. H. Markham  
BY Hall and Fay  
ATTORNEYS (No Model.) 7 Sheets—Sheet 6.
S. H. MARKHAM.
MACHINE FOR MAKING NUTS.

No. 515,005. Patented Feb. 20, 1894.

(No Model.) 7 Sheets—Sheet 7.
S. H. MARKHAM.
MACHINE FOR MAKING NUTS.

No. 515,005. Patented Feb. 20, 1894.

Witnesses
Geo. A. Snow.
Wm. Lecher.

Inventor
S. H. Markham
By Hall and Fay
Attorneys

UNITED STATES PATENT OFFICE.

SAMUEL H. MARKHAM, OF CLEVELAND, OHIO.

MACHINE FOR MAKING NUTS.

SPECIFICATION forming part of Letters Patent No. 515,005, dated February 20, 1894.

Application filed October 23, 1890. Serial No. 369,015. (No model.)

*To all whom it may concern:*

Be it known that I, SAMUEL H. MARKHAM, a citizen of the United States, and a resident of Cleveland, county of Cuyahoga, and State of Ohio, have invented certain new and useful Improvements in Nut-Forging Machines, of which the following is a specification, the principle of the invention being herein explained and the best mode in which I have contemplated applying that principle, so as to distinguish it from other inventions.

The annexed drawings and the following description set forth in detail, one mechanical form embodying the invention; such detail construction being but one of various mechanical forms in which the principle of the invention may be used.

Figure 4:
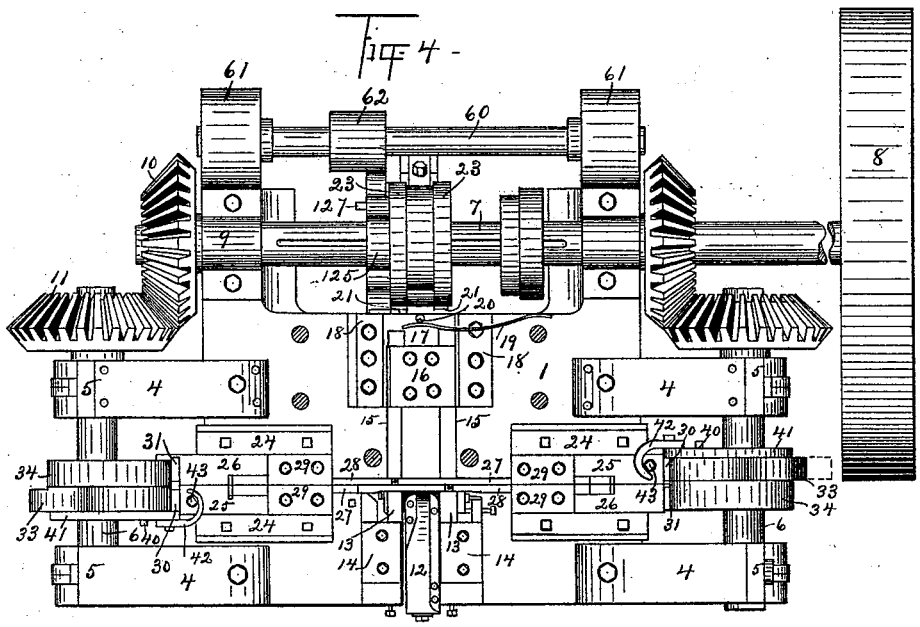
Figure 5:
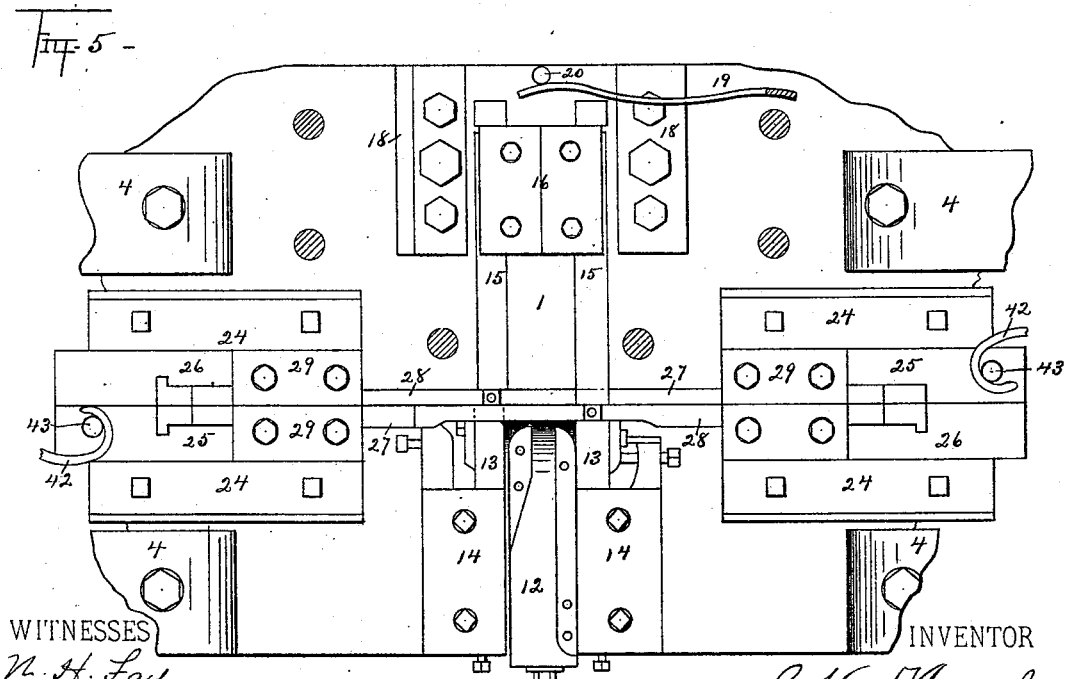
Figure 6:
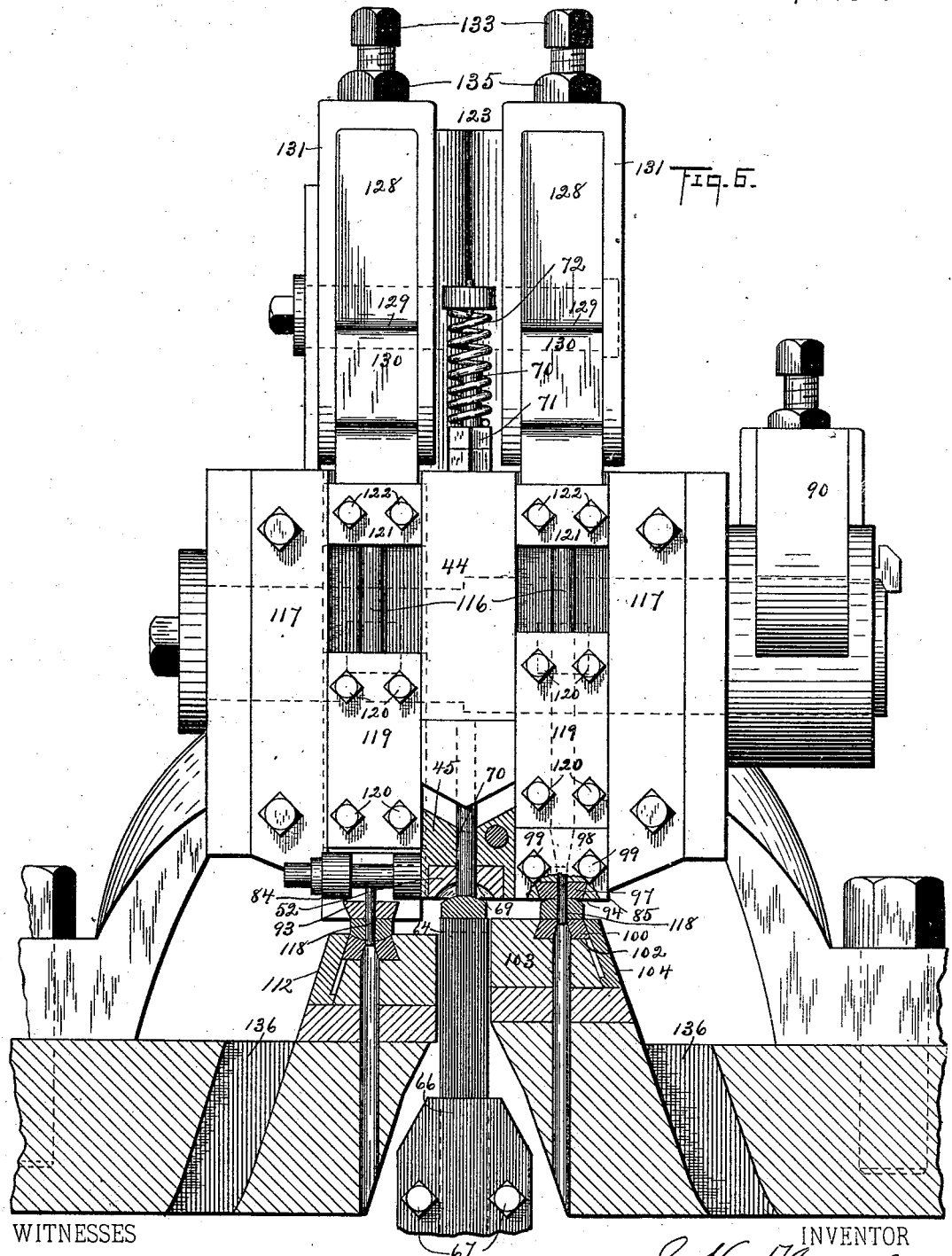
Figure 7:
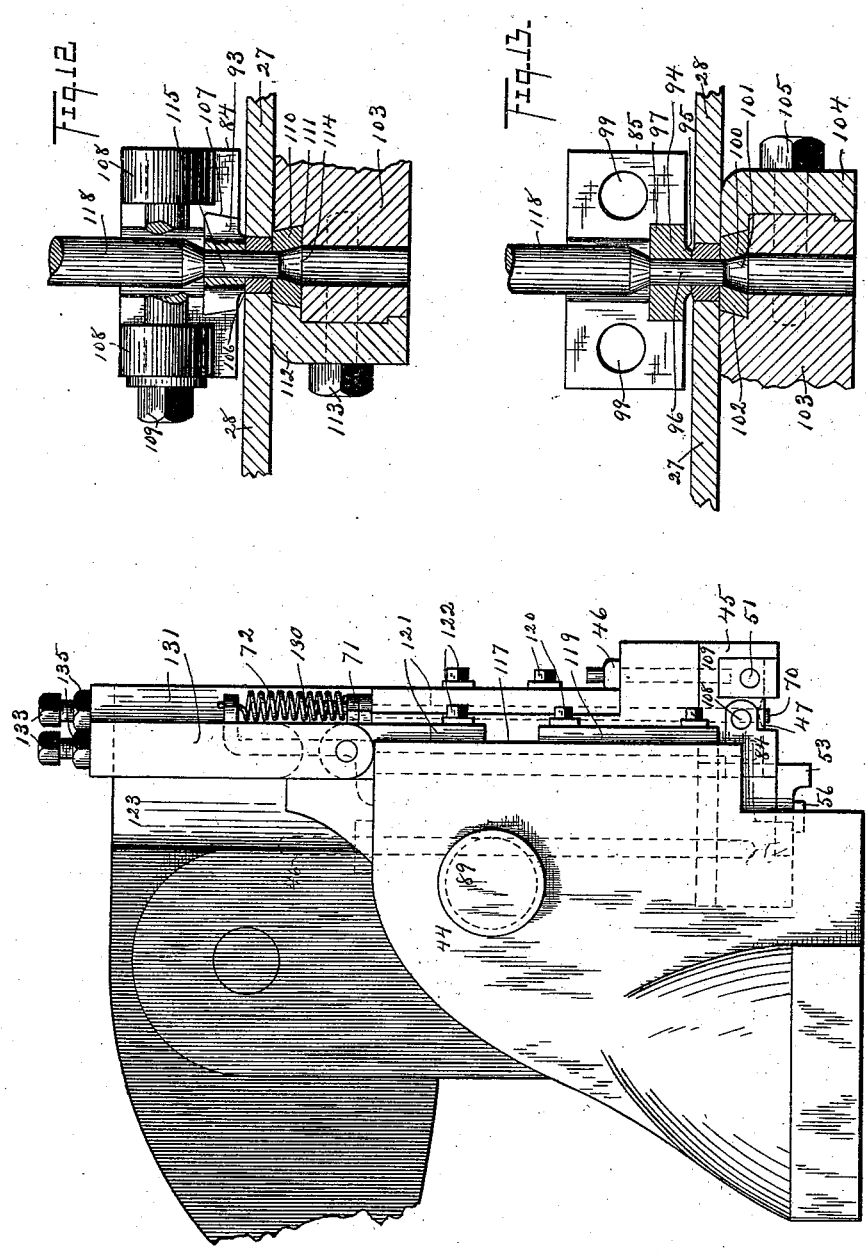
Figure 8:
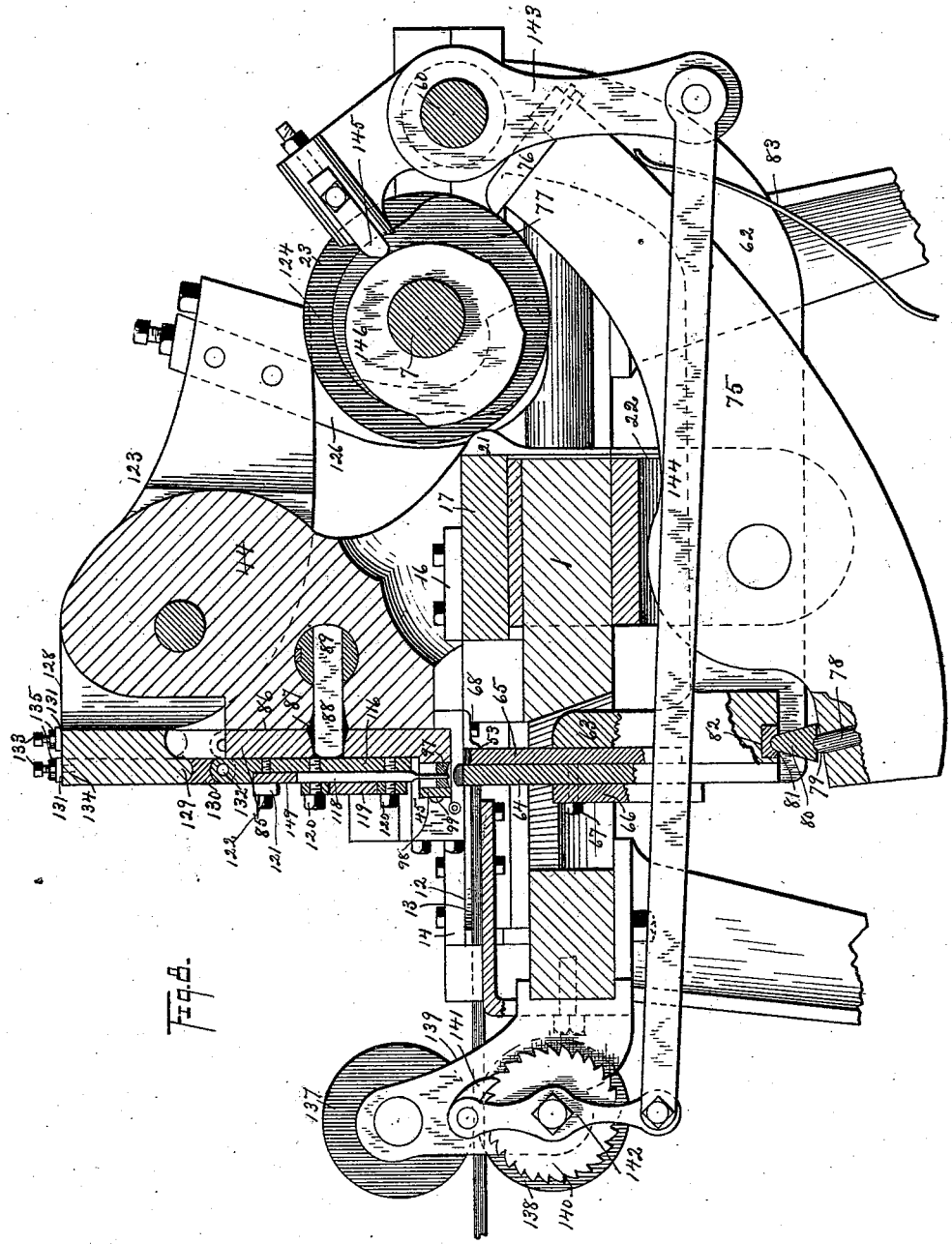

In said annexed drawings—Figure 1 represents a front elevation of my improved nut forging machine; Fig. 2, a rear elevation; Fig. 3, a side elevation; Fig. 4, a top plan view; Fig. 5, a top plan view on an enlarged scale of the converging hammers and the guide for the bar; Fig. 6, a front view, partly in section and on an enlarged scale, of the head and a portion of the bed of the machine; Fig. 7, a side elevation of the head; Fig. 8, a transverse, vertical, sectional detail view of the upper portion of the machine, illustrating the application of the feeding mechanism; Fig. 9, a sectional detail view, illustrating the operating mechanism for the crowners or flatteners; Fig. 10, a perspective, inverted, detail view of the upper shear block; Fig. 11, a sectional detail view of the shear block and shears, illustrating the operation of the same; Figs. 12 and 13, sectional detail views of the dies and piercers, illustrating the process of flattening or crowning and piercing the nuts; Fig. 14, a detail front elevation, illustrating the mechanism for preventing the side hammer from flying under the die and piercer, and, Fig. 15, a detail sectional view of the shears or cutters, showing them in the act of cutting off the nut blanks and showing the grain in the metal being cut.

In said drawings the numeral 1 indicates the main frame of the machine which is mounted upon suitable legs, 2, connected by horizontal cross pieces, 3, near their lower ends. Bearing brackets, 4, project laterally from the sides of said frame and are formed with bearings, 5, in their ends, in which shafts, 6, are journaled, parallel to and slightly above the side edges of said main frame.

A main or drive shaft, 7, upon one end of which a drive pulley, 8, is secured, is journaled in bearings, 9, near the rear edge of the main frame, in the same horizontal plane as the shafts 6, and bevel cog wheels, 10, are secured upon said shaft, outside said bearings 9 and mesh with bevel cog wheels, 11, upon the rear ends of the shafts 6.

A horizontal guide, 12, is formed at the middle of the forward edge of the main frame, slightly exceeding the width of the bar from which the nuts are to be cut and which is fed through said guide.

Two stationary, forward hammers, 13, are horizontally secured to the frame, at the forward edge and upon the upper side of the same, by means of clamping plates, 14, and two registering, movable hammers, 15, are secured by means of clamping plates, 16, upon a slide, 17, which slides in suitable horizontal guides, 18, upon the top of the main frame and at the rear edge of the same. A flat spring, 19, is secured upon the top of the main frame and has its free end bearing against a stud or pin, 20, upon the movable hammer slide 17, near the rear end of the same, serving to draw said slide back. The upper ends of two spring arms, 21, bear against the rear edge of said hammer slide and are secured with their lower ends to brackets, 22, projecting downward from the under side of the main frame. Two cams, 23, are secured upon the drive shaft 7 and bear with their peripheries against the backs of said spring arms which are held in constant contact with said cams and are, consequently, rocked by them when they are revolved, in their turn pushing the hammer slide which is forced against them by the spring 19. Said stationary, forward and movable, rear hammers serve to square the forward and rear sides of the nut blanks after they have been cut and slid aside from the shears, as will hereinafter appear. One of the forward hammers,—the hammer to the left in the drawings,—is longer than the other and in a plane below the same, and the movable, rear hammers are of corresponding lengths and likewise one in a plane below the other.

Guides, 24, are secured upon the top of the main frame, near the front edge of the same and at the side edges, said guides being at right angles to the guides 18 for the rear hammer slide. Two pairs of hammer slides, 25 and 26, slide in said guides and side hammers, 27 and 28, are secured upon said slides by clamp plates, 29. The longer side hammers 27 are of sufficient length to extend to near the ends of the shorter side hammers 28, sufficient to square the sides of the nuts, when even with the shorter hammers at their inner ends, and the forward pair of side hammers is placed in a plane above the rear pair.

The upper ends of two pairs of bearing arms, 30 and 31, bear against the outer ends of the hammer slides, and said arms are pivotally supported at their lower ends upon the side cross pieces 3 of the frame. Springs, 32, secured to the frames and engaging the slides 26 of the shorter hammers, serve to force said hammers and slides outward. Cams, 33 and 34, upon the shafts 6 bear against the outer sides of the upper ends of the bearing arms and may reciprocate the hammer slides when they are revolved. The cams 33 are formed with two, nearly opposite bulges, 35 and 36, one, 35, of which pushes the hammer slide and the long hammer sufficiently across the frame to push the nut from the shears to a point beneath the piercer, while the other bulge, 36, slides the hammer across said point and pushes the nut to the discharge opening. The bearing arms 30 are provided with flat and coiled springs, 37 and 38, for drawing them outward against the cams and have outwardly and upwardly-curved, flat arms, 39, which may be engaged by the bulges 36 of the cams 33 and prevent the hammer slides from flying too far and getting the hammer beneath the flatteners and piercers. Pins, 40, project from the faces of the cams 33 and may engage the outwardly and downwardly-curved extensions, 41, of the bearing arms 30, retracting the same from the main frame. Said arms 30 are provided with inwardly-extending hooks, 42, which engage upwardly-projecting studs, 43, upon the hammer slides 25, and said hooks may thus positively retract the hammer slides when the arms are retracted without any lateral pull, as said studs are secured in the axial lines of the slides and the strain will, consequently, come directly in their axial lines.

A head frame, 44, is secured upon the middle of the main frame and bridges over the rear, movable hammers and the inner end of the bar guide 12. The upper shear block 45 is secured in said frame by means of two bolts, 46, and is formed with a transverse, rectangular recess, 47, in its under side, said recess being of the same width as the nut to be cut. Suitable steel bits, 48, and 49 are secured in the lower face of said shear block by means of clamping plates, 50, and bolts, 51, to form sharp and durable cutting edges for said recess, and a concave crowner tool or die, 52, of the curve desired for the crown of the nut is secured in the bottom of the recess, as plainly shown in Figs. 10 and 11 of the drawings. A gage, 53, having a cross head, 54, and a longitudinal slot, 55, is secured by a bolt, 56, passing through said slot, to the under side of said block and has two adjusting screws 57, which pass through projections, 58, between which the slotted portion of the gage slides and bears against the rear side of the cross head of the gage. An adjusting screw, 59, bears against the forward edge of the forward bit 48 and serves to adjust the same to cut the proper width of nut.

The die 52, the shear block and the head frame are formed with a vertical perforation, 69, in which slides a pin, 70, having nuts, 71, upon its upper end to adjust the degree to which it projects through the die, and a spring, 72, which forces the pin downward to push the nut out of the recess in the shear block after it has been cut off. The portion of the shear block forward of the recess, and its bit 48 therein, is preferably in a plane slightly below the plane of the portion to the rear of the recess and its bit 49 so that the bar which is fed beneath the shear block will not strike the edge of said bit 49 and be stopped, but may freely pass to the gage 53, said difference in planes being preferably accomplished by making the rear bit thinner than the forward bit.

A shaft, 60, rocks in bearings, 61, projecting from the rear edge of the frame and has a downwardly and forwardly-curved arm 62, secured upon it. Said arm has a laterally-bent and upwardly-projecting, forward end, 63, to the front side of which the cutter or shear 64, and the inner blank rest 65 are secured by a clamping plate, 66, and screw bolts, 67. Said cutter and rest are of unequal length, the cutter 64 being as much longer than the inner blank rest 65 as the height or thickness of the nuts to be cut. The cutter may enter the transverse recess in the upper, stationary shear block and is of sufficient width to have its edges pass snugly by the bits in the edges of the same. The inner, shorter blank rest 65 is concaved to crown the inner nut as the latter is cut or sheared from the bar, as shown at 68 in Figs. 8 and 11, although I may also crown the blank resting upon the same by a separate crowner, as will appear later. A spring, 73, secured at one end upon the machine frame, bears against a stud, 74, upon the arm 62 and serves to draw said arm downward.

A lever, 75, is fulcrumed between the brackets 22, beneath the machine frame and has an adjustable, steel nose-piece, 76, upon its rear arm, which bears against the periphery of a cam, 77, upon shaft 7, so that said cam may rock said lever. A pin, 78, of hard steel is secured in the forward arm of said lever and has its upper, rounded end projecting above the upper edge of the lever into a correspondingly-rounded recess, 79, in the base of a conical steel arm, 80, the rounded apex of which fits into a rounded recess, 81, in a steel block, 82, inserted in the lower end of the up-turned end portion 63 of the shear-supporting arm 62. The cutter and rest may thus be vertically reciprocated by said lever and cam and the hard steel pin, cone and block will be capable of resisting the pressure required for cutting and crowning the nut blanks. The upper end of a spring, 83, secured to the rear cross piece of the frame legs, bears upon the under side of the rear end of the shear-operating lever and forces the same against the periphery of the cam.

Two flattener slides, 84 and 85, slide in vertical guides, 86, in the front of the head frame, and are formed with openings, 87, into which the forward ends of two arms, 88, project from a shaft, 89, transversely-journaled in the head frame. An arm, 90, is secured to extend rearward from one end of said shaft and has an adjustable steel nose-piece, 91, at its rear end, which may bear from above against the periphery of a cam, 92, upon the shaft 7. Said cam has a bulge or swell, 147, which serves to raise the end of the arm and depress the slides to flatten the blanks, and another, smaller and steeper bulge or swell, 148, which rocks the arm and depresses the slides so as to give the finished nuts and the long hammers a tap which will release the nuts from the ends of said hammers if they by accident have become embedded in or otherwise caught by the nuts. The lower ends of said flattener slides project forward and have tools or dies, 93 and 94, secured in them. The die 94 in the slide 85 is preferably formed with a flat projection, 95, around the central perforation 96 for the piercer, and said die or tool is inserted into a corresponding groove or recess, 97, in the end of the slide and secured by a clamping plate, 98, secured over the front side of the slide by screw bolts 99. A die or tool, 100, having a central perforation, 101, registering with the central perforation in the upper tool or die, is dovetailed in a corresponding recess, 102, in the bed block, 103, upon the main frame and is held in the same by a clamping plate, 104, which is secured by a screw or screws, 105. Said tool or die has its upper surface in the plane of the forward pair of side hammers and is in a line with the same and the corresponding, forward and rear hammers, and the longer of said hammers may slide across the face of the same.

The die 93 in the slide 84 is formed with a flat face, 106, and is dovetailed to fit into a dovetailed recess, 107, in the lower, vertically-split end of the side which is formed upon its front with two perforated ears or lugs, 108, through which a screw bolt, 109, is inserted to draw the parts of said split end together, and to clamp said tool or die. A dovetailed tool or die, 110, is inserted in a corresponding recess, 111, in the bed block 103 and is secured therein by a clamp, 112, and screw, 113, and said tool or die has preferably, a flat face, as shown in Fig. 12, to flatten the convex top of the nut, which has already been crowned in the blank rest, or it may have a concave crowning face, as shown in Fig. 6, if the nut has not before been crowned. Said tool or die 110 has a perforation, 114, registering with the perforation 115 in the upper die 93 for the passage of the piercer. Said tool or die has its upper surface in the plane of the rear pair of side hammers and is in a line with the same, so that the longer hammer of said pair may slide across its face and push the finished nut away from the same.

Two piercer slides, 116, slide vertically in guides, 117, upon the forward face of the head frame and upon the faces of the flattener or piercer slides, and said slides have the upper portions of the piercers 118 secured upon their faces by means of clamping plates or bolts, 119 and 120. Pins, 149, having their surfaces knurled or roughened are secured upon the piercer slides by means of plates, 121, and bolts, 122, and bear against the upper ends of the piercers, preventing vertical displacement of the latter. The piercers project with their lower ends through the lower, projecting portions of the flattener sides and through the perforations in the tools or dies in the same and beneath the same. The piercers may be adjusted to their proper height in the slides by means of the clamping plates and the knurled pins and their plates.

A lever, 123, is fulcrumed in the top of the head frame and has its rear end provided with an adjustable steel nose piece, 124, which bears against the periphery of a cam, 125, upon the shaft 7, so that said lever may be rocked by said cam. A hook, 126, projects downward and rearward from the rear end of the lever and may be engaged by a stud, 127, upon the face of the cam 125, so that the lever may have its rear arm positively drawn down by said stud and hook. The forward end of the lever is forked and each arm, 128, is formed with a transverse, cylindrical lip, 129, which fits and rocks in the upper concave end of a knuckle, 130, the lower, concave end of which fits and rocks upon the cylindro-convex upper end of a piercer slide. Straps, 131, straddle the forked arms 128 and are pivoted at their lower ends upon bolts, 132, which pass transversely through the upper ends of the piercer slides, axial to the convex ends of the same. Screw bolts, 133, pass through the upper, doubled ends of the straps and project with their pointed ends into recesses, 134, in the upper edges of the forked lever arms and are provided with jam nuts, 135.

The main frame has openings, 136, at the sides of the bed block, through which the finished nuts may be discharged, suitable chutes or troughs being preferably secured beneath said openings for conveying the nuts out at the sides of the machine.

In Fig. 8 is illustrated a feeding mechanism for the machine, which consists of a pair of rollers, 137 and 138, preferably having peripheral grooves of the width of the bar to be fed and journaled in brackets, 139, upon the front edge of the main frame and with their grooves registering with the guide 12. A ratchet wheel, 140, is secured to one face of the lower roller and is engaged by a pawl, 141, upon a lever, 142, which is fulcrumed upon the shaft of said lower roller. A lever, 143, is fulcrumed upon the rock shaft 60 and the lower ends of said levers are connected by a connecting rod 144. The upper arm of said lever 143 has an adjustable steel nosepiece, 145, which bears against the periphery of a cam, 146, upon the shaft 7.

In practice, after the machine has been started, the bar which has been heated to a suitable red heat is fed into the guide 12, beneath the shear block and above the cutter and blank rest. The shape of the shear block, having the rear cutting edge in a plane slightly above the forward cutting edge, will admit of the bar passing freely in against the gage without the necessity of being very carefully guided. When the end of the bar has reached the gage, the movable cutter and the rest are raised by the shear-operating lever and cam, and two nut blanks are cut off from the bar, the inner one resting upon the inner rest and against the bit 49 and the other one resting upon the outer, higher cutter and within the recess in the shear block. The outer nut blank is crowned in the recess 47 of the shear block upon its upper face and will be forced out of said recess by the pin 70 and spring 72, and the inner nut blank is crowned upon its lower face by the inner rest. The cutters are thereupon retracted and the longer hammers slide inward and push the nut blanks off from the cutter and rest and over upon the lower tools or dies, where the shorter side hammers and the movable, rear hammers strike them and, together with the stationary, forward hammers, square the blanks. The flattener slides have in the meantime descended, and the flat projection 95 upon the forward tool or die will flatten the portion of the crowned, outer or forward blank around the center so as to give the nut a perfect finish upon its top. The inner dies will flatten the central portion of the crowned, under side of the nut. While the nut blanks are held by the hammers and tools or dies the piercers descend and pierce the holes in the nuts. As the blanks are held perfectly confined by the tools or dies and the hammers, the piercers will form perfect holes in the nuts and will shear or punch out the metal without leaving fins or rough edges, the piercers fitting accurately in the central perforations in the tools or dies. By crowning the upper nut in the shear block, the nut will be flatter, on account of the pressure of the latter, than if crowned outside of the block, and the hammers may be of the same thickness or thicker than the blank, as there need be no space for a descending crowner tool, but simply for a flat projection of a much smaller area than the nut. After the nuts have been pierced the piercers are withdrawn, the dies in the crowner or flattener slides strip the nuts off from the piercers and said slides are thereupon raised so that the longer hammers may push the finished nuts off from the lower dies to the discharge openings, the crowner or flattener slides giving the longer hammer the tap which will release the nut. The larger bulges or swells 36 of the hammer-operating cams will strike the arms 39 upon the bearing arms 30 and thus act as positive stops for the slides of the long hammers, preventing said hammers from flying beneath the piercers, as they would be liable to do on account of the high speed with which the machine runs, if no positive means for stopping said slides were provided. Said larger bulges serve also to force the longer hammers across the tools or dies in which the nuts are finished to discharge the finished nuts.

My machine may be continuously fed if provision for heating the bars be provided, and the bars need not be withdrawn and turned after each nut is cut off, as is necessary in the nut machines now in use. An unskilled person may feed the machine as well as a skilled mechanic, in fact the automatic, unthinking feed mechanism will perform the feeding as perfectly and satisfactorily as the most skilled mechanic. The machine may be fed directly and in one heat from the finishing rolls of a rolling mill, saving the time and expense of reheating the bars, besides providing a much smoother bar for the cutters than a reheated bar, which is always liable to become scaly and rough by being heated.

The smallest sizes as well as the very largest sizes of nuts may be made upon suitable sizes of my machine, and my machine will occupy less space in proportion to the output than any machine now in use with which I am acquainted.

The output of my machine will be from three to four times larger than the output from the machines now in use, the nuts being of the same size and the power being equal, the capacity of a one-half inch square nut forging machine of my construction being over two hundred and eighty per minute, the drive shaft making one hundred and forty revolutions per minute. The principal reason for this increase in the output over existing machines are the facts that two nuts are cut off from the bar at each revolution and no time is lost in retracting and turning the bar at each cut.

If desired, the nut-blanks may be cut off by the shears, whereupon they may be crowned and flattened in dies therefor, and finally they may be pierced while, however, they are yet held by the crowning and flattening dies.

The outer or forward nut blank, which is cut and forced up in the recess of the shear block, is preferably always crowned upon its upper side and the inner or rear nut blank upon the under side, as the cutting edges of the recess in the shear block will slightly round the upper edges of the cut ends of the nut blank and the outer or forward cutter will, by being forced upward in said recess through the bar and thus as it were, punching out the forward blank round the lower edges of the cut ends of the inner nut blank and the bar, give the upper side of the outer blank and the under side of the inner blank a preliminary rounding, as shown, slightly exaggerated in Fig. 15 of the drawings, in which the grain of the metal is indicated to show the rounding of the edges of the bar.

The foregoing description and accompanying drawings set forth, in detail, mechanism embodying my invention; change may be made therein provided the principles of construction respectively recited in the following claims are employed.

I therefore particularly point out and distinctly claim as my invention—

1. In a machine for simultaneously forging two nuts, a shear block formed with a transverse recess of the width of the nut to be cut and with the face to the rear of said recess in a plane above the face forward of said recess, substantially as set forth.

2. In a machine for simultaneously forging two nuts, a shear block formed with a transverse recess of the width of the nut to be cut and with the portion of its face to the rear of said recess in a plane above the portion of the face forward of said recess, and provided with an adjustable gage upon said rear face-portion, substantially as set forth.

3. In a machine for simultaneously forging two nuts, a shear block formed with a transverse recess in its lower face of the width of the nut to be cut, formed with the portion of said face to the rear of said recess in a plane above the portion forward of the same, provided with insertible, hard metal bits in said faces, and with an adjustable gage upon the rear face portion, substantially as set forth.

4. In a nut forging machine, the combination of an upper shear block formed with a transverse recess in its lower face and with the portion of the face to the rear of said recess in a plane slightly above the portion forward of said recess, an adjustable gage upon said rear face portion, and a cutter and a rest having the upper face of the cutter in a plane above the upper face of said rest, substantially as set forth.

5. In a nut forging machine, the combination of a pair of shears or cutters constructed to cut off two nut blanks, one in a plane above the other, pairs of side hammers sliding in the planes of said shears or cutters, stationary tools in the planes of said hammers and at both sides of said shears, sliding tools opposite said stationary tools, sliding piercers projecting through said sliding tools, and cams connected to operate said tools and piercers,—the bulges upon such cams operating the tools being in advance of the bulges upon such cams operating the piercers, so that said tools will be actuated before said piercers, substantially as set forth.

6. In a nut forging machine, the combination of a pair of shears or cutters formed with faces for cutting two nut blanks at one time and one in a plane above the other, hammers sliding in the planes of the shears and operative to move and square the nut blanks, stationary tools in the paths and planes of said hammers, movable tools opposite said stationary tools, piercers projecting through and movable in said movable tools, and cams connected to operate said shears, hammers, tools and piercers and having their bulges arranged to successively operate said parts in the order enumerated, substantially as set forth.

7. In a nut forging machine, the combination of an upper shear block formed with a recess having a crowner tool and with a gage, a vertically movable cutter and blank rest having the face of the cutter in a plane above the rest, hammers sliding in the planes of the cutter and rest and operative to move and square the nut blanks, a stationary perforated flattening tool in the path of the upper hammers, a perforated crowning tool in the path of the lower hammers, a movable flattener slide, having a perforated tool in its end, a movable crowner slide having a perforated tool in its end, piercers, projecting through and sliding in said perforated tools, and cams connected to operate said shears, hammers, slides and piercers and having their bulges arranged to successively operate said parts in the order enumerated, substantially as set forth.

8. In a nut forging machine, the combination of a horizontally sliding side hammer, a revolving cam having a smaller and a larger, nearly opposite bulge or swell, and a bearing arm interposed between said hammer and cam, connected to said hammer, and formed with an outwardly and upwardly extending arm arranged to be engaged by said larger bulge, substantially as set forth.

9. In a nut forging machine, the combination with mechanism for crowning nut blanks, and side hammers for forging the sides of the blanks and retaining the same, of a flattener tool having a flat projection upon its center of a less diameter than the space between the side hammers, whereby the centers of the crowned nut blanks may be flattened while retained from all sides and without injury to the retaining side hammers, substantially as set forth.

10. In a nut forging machine, the combination with a vertically-sliding flattener or crowner slide and a horizontally-sliding hammer for moving the nut blanks under said slide and away from under said slide to a discharge opening, of an arm connected to reciprocate said slide, and a cam in contact with said arm and having a larger bulge for depressing the slide upon the nut blank and a subsequent, smaller and steeper bulge for depressing the slide to lightly tap the hammer, substantially as set forth.

In testimony that I claim the foregoing to be my invention I have hereunto set my hand this 22d day of October, A. D. 1890.

S. H. MARKHAM.

Witnesses:
J. B. FAY,
WM. SECHER.